United States Patent Office

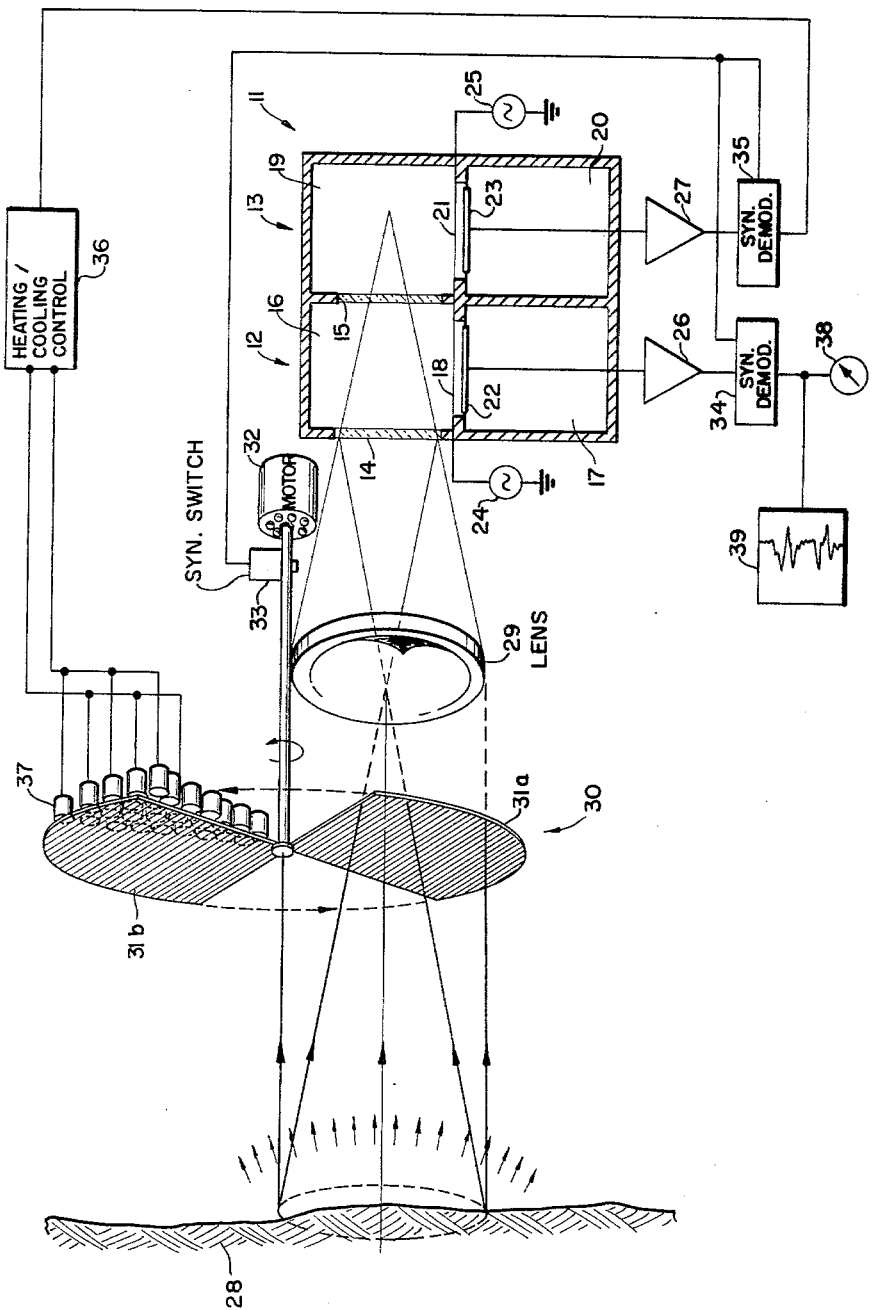

3,234,380
Patented Feb. 8, 1966

3,234,380
INFRARED ANALYZER WITH MEANS RESPONSIVE TO A DETECTOR OUTPUT TO CONTROL RADIANT ENERGY EMISSION FROM A REFERENCE SOURCE
Max D. Liston, La Habra, and James G. Myers, Fullerton, Calif., assignors to Beckman Instruments, Inc., a corporation of California
Filed Aug. 14, 1963, Ser. No. 302,156
10 Claims. (Cl. 250—43.5)

The present invention relates to infrared analyzers, and more particularly to open path type infrared analyzers.

Originally, analyzers based on infrared absorption exhibited by a gas to be determined or analyzed were provided with a sample cell in the form of a tube or other suitable enclosure having inlet and outlet openings for the sample, usually a gas, and provided with infrared transparent windows at opposite ends. In these analyzers, infrared radiation of a relatively high intensity is passed through the cell and the absorption by the sample, usually in a narrow wavelength band, is measured in some fashion so as to give an indication of the content of the gas to be determined in the sample stream. More recently, however, attempts have been made for utilizing infrared analyzers for the analysis of substances such as gases or aerosols that occur in the free atmosphere and the analyzer in this case observes radiation coming from an open path. Such instruments may be used in conjunction with studies of air pollution and the detection of various other substances or agents in the atmosphere.

In the classical infrared analzer there is usually provided a source within the instrument itself. Such a source may produce chopped or modulated radiation at relatively high energy levels. There may be provided either a periodically energized source such as a tungsten wire to which current is intermittently supplied or a continuously energized source that is periodically interrupted by a chopper blade. This is done because the detection or radiation absorption, in so-called infrared analyzers as well as in many other analytical instruments based on optical absorption, can be made much more accurate by utilizing chopped or modulated radiation so that zero drift problems are greatly reduced by this expedient.

For open path analyzers a particular problem arises in that the radiation whose characteristics are measured is emitted by a variety of objects located at sometimes great distances from the analyzer and may include such objects as clouds, water, the ground and any other remote objects. Obviously the radiation coming from such objects cannot be controlled in the same fashion that a periodically energized source can be controlled by sending a current therethrough intermittently, and it is therefore necessary to use, under these circumstances, a rotating light chopper or similar device.

However, the use of a chopper blade so as to intermittently interrupt the radiation path from the background to an entry opening of the instrument meets with certain difficulties. These difficulties are related to the fact that the background from which radiation is emitted is at a temperature not greatly different from that of the instrument itself including the chopper blade or other moving device. Therefore, the latter, instead of almost completely interrupting the radiation intermittently coming from the open sample path replaces it by radiation at only a slightly different energy level. Any temperature changes in part or all of the natural background or in the instrument itself cause relatively large shifts in the measurement and impose difficulties upon the performance of reliable measurements with open path type infrared analyzers.

It is an object of the present invention to overcome certain basic difficulties encountered in open path type infrared analyzers.

Furthermore, it is an object of the present invention to provide an analyzer in which the temperature of an object serving as an optical source is controlled as a function of that of the background.

More specifically it is an object of the present invention to overcome difficulties related to the fact that a chopper blade as utilized in optical analyzers, specifically infrared analyzers of the open path type, emits radiation at an energy level comparable to the energy level that reaches the detector from an open sample path.

According to one important aspect of the invention, an arrangement is provided in which the temperature of the blade or chopper is maintained at such a temperature that the circumstances for making analysis of an unknown are optimized. An important element of the invention is the use of first and second detectors, the first responding to radiation of a wavelength whose intensity varies as a function of the unknown along the sample path and the second responding to radiation having a wavelength that is relatively independent of the presence of the unknown agent to be detected. The first detector generates a signal that varies as a function of the unknown, said signal alternating with the frequency in which the optical path is opened to the background and blocked therefrom by a chopper blade or similar device. The chopped radiation also impinges upon the second detector that is preferably responsive to radiation in which the unknown has no deep absorption bands and generates a signal that is applied to a control loop. The control loop includes cooling or heating means and maintains the chopping blade or device at such a temperature that the signal of said second detector is reduced to a very low value, preferably to zero. With the temperature of the chopper blade or corresponding device that enters periodically into the optical path thus controlled, variations in the magnitude of the first detector signal are due to the presence along the optical path of substances exhibiting a characteristic behavior at the wavelength for which said first detector is sensitive. With a narrow bandwidth response of the first detector the complete arrangement will be highly selective to the unknown to be determined.

The invention can be performed with a variety of types of detectors. However, it is necessary that at least one detector can be made sensitive to radiation in a relatively narrow bandwidth near the wavelength at which the unknown agent to be detected along the open path exhibits its characteristic. The second detector may either be sensitive to a single narrow band of radiation in a spectral area close to the characteristic radiation of the unknown or in one or more relatively wide bands that preferably do not include the radiation band for which the first detector is sensitive.

Particularly advantageous is an arrangement in which the second detector is sensitive for wavelengths at both sides of the wavelength to which the first detector is responsive. Such an arrangement is the detector structure disclosed in U.S. Patent No. 2,924,713 issued to M. D. Liston and assigned to the assignee of the present application. The said patent discloses an infrared analyzer comprising a first microphonic detector preferably charged with a small amount of the unknown gas or a gas having absorption characteristics similar thereto and a second detector arranged in optical series relation with the first that is charged with a larger amount of the unknown or with other gases. If the absorption in the first detector occurs in one or more relatively deep absorption bands, even a relatively small charge in the first detector will almost completely prevent radiation in the absorption band or bands to reach the second detector. However, because of the heavier charge in the second detector, it will absorb considerably in both side bands or each individual absorption band.

As the second detector, according to the invention, serves to control the temperature of an object, such as a sector blade of a radiation chopper that comes into the optical path between the background and the detectors, it should preferably be sensitive in spectral areas at both sides of the absorption band of the unknown. The serial detector arrangement disclosed in said U.S. Patent No. 2,924,713 is particularly advantageous for use in conjunction with the present invention.

However, it should be clearly understood that the invention is not restricted to detectors of any particular type, nor to detectors that are arranged in optical series relationship. The detectors may also be arranged side by side in the optical path, and they may be given suitable wavelength response, by various means such as filters and the like. It is sufficient to provide two detectors one of which is responsive to radiation of a wavelength at which the unknown exhibits a characteristic that is different from the general background and the other being responsive to some other wavelength, though preferably in not too remote a spectral area.

The invention and its advantages will be better understood from the following description of a preferred embodiment given in conjunction with the drawing that comprises a single figure.

The structure shown in the figure comprises a detector assembly 11 having sealed detectors 12 and 13 arranged in optical series relationship and windows 14 and 15 that allow the entrance of infrared radiation to the first detector 12 and its passage toward the second detector 13. The windows are made of a material that is transparent for infrared radiation of a suitable wavelength. The first detector 12 comprises zones 16 and 17 separated by a perforated gold membrane 18, and the second detector 13 comprises zones 19 and 20 separated by a perforated gold membrane 21. Close to membrane 18 there is disposed a rigid conductive plate 22 and close to the membrane 21 a rigid conductive plate 23. An A.C. voltage source 24 is connected to the membrane 18 and an A.C. voltage source 25 is connected to the membrane 21.

The detectors 12 and 13 have suitable gas fillings. In general the gas in the first detector 12 may be a low concentration of the gas to be detected; whereas, the second detector 13 may have a filling of the same gas at a higher concentration.

When pulsed radiation of a wavelength that is absorbed by the gas fillings impinges upon the detectors, the gas in zones 16 and 19 is periodically heated and expands causing the membrances 18 and 24 to move away from and toward the plates 22 and 23. This varies the impedance formed by the elements 18 and 22, and 21 and 23, respectively, causing the signals generated by the A.C. sources 24 and 25 to reach respective amplifiers 26 and 27 with varying intensities. The amplifiers 26 and 27 may be envelope detectors so that their output is a low frequency signal that alternates with the frequency at which the infrared radiation that impinges upon the detectors is varied.

In the infrared analyzers according to the invention, the source of infrared radiation that is utilized for obtaining readings is generally not a relatively high intensity source placed within the framework of the instrument but is formed or constituted by the background of the instrument toward which the optical elements of the analyzer are directed. The background or distant source of infrared radiation may be constituted by the elements of the landscape with its various solid objects and, furthermore, by other background elements such as water, the sky, etc. Though in many cases the distance of the infrared source may be many miles, in other cases, this distance may be smaller depending on the specific application for which the instrument is intended. It is, however, important for the understanding of the operation of the infrared analyzer according to the invention that the source of infrared radiation that is utilized in conjunction with the instrument is uncontrolled. This absence of control is, in general, caused by the remote location and the very nature of the objects that are utilized as a source. The distant source is, as shown in the figure, indicated by reference number 28. In general it is desirable that a definite portion of the distant source or background is depicted within the instrument so that beam defining means are desirable. The beam defining means for defining an optical path in the embodiment of the figure includes a lens 29 made of a material that is transparent for the infrared radiation of interest, such as materials including rock salt and potassium bromide.

The means for pulsating the radiation from the background that impinges upon the detector includes a chopper blade 30 driven by a motor 32. The chopper blade 30 driven by a motor 32. The choper blade 30 includes opaque sections 31a and 31b each extending 90° of the circumference of the chopper blade 30, said opaque sections 31a and 31b alternating with open sections that are, of course, completely transparent to infrared radiation. The common shaft of the motor 32 and the chopper blade 30 is placed to one side of the optical path so, that upon rotation, radiation from the background is alternately admitted to and obscured from the detecting unit 11.

A synchronous switch 33 is operated by the shaft of the motor 32 and provides a signal that is synchronous with the appearance of the open sections of the chopper blade 30 in front of the lens 29. The switch may be of a mechanical design and derive its operation from a suitable cam (not shown) fixedly mounted on the shaft of motor 32, or it may be an optically operated device such as a photoresistor in conjunction with a suitable light source that is operated by alternate opaque and transparent sections of a disk placed upon the motor shaft in a fashion well known in the art. As mentioned before, the alternating signals provided at the output of amplifiers 26 and 27 have a frequency equal to the light chopping frequency caused by the chopper blade 30. The purpose of the synchronous switch 33 is to provide a controlling signal for synchronous demodulators 34 and 35 that convert the output of the respective amplifiers 26 and 27 into direct current signals. The synchronous demodulators 34 and 35 may be followed by suitable filter (not shown).

The synchronous demodulator 35 has its D.C. output connected to the input of a heating-cooling controller 36 that supplies current to a plurality of suitable thermoelectric or other type of heater-coolers 37. The individual thermoelectric heater-cooler devices may be connected in parallel as is shown in the figure or in any type of series parallel combination so as to match the output impedance and power of the heating and cooling controller 36. Each of the individual elements 37 may comprise a unit that exhibits the Peltier effect and causes cooling when a current of suitable polarity is directed therethrough; whereas each causes heating when a current of opposite polarity is passed therethrough. The heater-cooler devices 37 are disposed in close proximity to and therefore in heat exchange relationship with that portion of the chopper blade 30 that passes therealong periodically during the time it is not interrupting the beam. The heat capacity of the chopper blade is, in general, sufficient to maintain its temperature substantially constant during a single passage or rotation.

It has been mentioned before that the second detector 13 is filled with a gas that adsorbs in a relatively broad area of the infrared spectrum. Its response is, therefore, not particularly specific to the unknown or the agent that is to be detected in the optical path defined between the background and the entry opening of the instrument. The purpose of the second detector 13, the amplifier 27, the synchronous demodulator 35 and the heating-cooling controller 36 in conjunction with the thermoelectric devices 37 is to provide or constitute a feedback path that reduces the signal observed at the output of the amplifier 27 to zero. In traditional nondispersive infrared analyzers the opaque sections of the chopper blade may be considered to be essentially a radiator of zero intensity because the intensity of the source, usually a hot filament, is so much higher that the radiation of the opaque section of the chopper blade in comparison therewith is completely negligible. However, in the instrument of the type of the present application, the temperature of the source may be somewhat lower or somewhat higher than that of the chopper blade with the consequence that the chopper blade temperature is no longer a negligible factor in consideration with the operation of the entire instrument. When it is first assumed that the temperature of the chopper blade 30 is lower than the color temperature of the radiation coming from the background that impinges upon the detector 13, the gas in the zone 19 of the second detector 13 expands during the time of impingement of the background radiation, and contracts a little during the time of passage of the opaque chopper blade in the optical path that is observed by the detector. In this condition, the output of the synchronous demodulator 35 may be a positive signal causing the heating-cooling controller to provide a current of such polarity to the heater-cooler units 37 that their temperature is raised until the temperature of the opaque sections of the chopper blade is equilibrated with the temperature of the background that is observed by the instrument and the output of the amplifier becomes zero. In the opposite case, that is when it is initially assumed that the chopper blade has a color temperature higher than that of the background, a current will be supplied to the thermoelectric heater-coolers of such polarity that their temperature and consequently that of the chopper blade is lowered until the output of the amplifier 27 again becomes zero.

It will be readily understood that a variety of arrangements may be found in which the desired result, described in conjunction with the operation of the temperature control of the chopper blade may be obtained. For instance, in case the Peltier effect is utilized the heating-cooling controller 36 may be a suitable power amplifier that operates on the signal provided by the synchronous demodulator 35. However, a similar result may be obtained when the heating-cooling controller controls a valve placed in a conduit that supplies cooling liquid to a heat exchanger disposed opposite the chopper blade. The blade may be continuously heated by some heating device with cooling applied intermittently when necessary to thereby operate in opposition to the continuously operating heater devices.

The first detector 12, in the arrangement as shown in the figure, in conjunction with the amplifier 26 and the synchronous demodulator 34 exclusively provides the output signal. A meter 38 and a recorder 39 are connected to the output of the synchronous demodulator 34 to provide an indication of the output signal. The first detector 16 is filled with a gas whose absorption characteristics are identical or very similar to that of an unknown agent whose presence in the optical path between the distant source and the entrance opening of the instrument is to be detected. In the absence of the unknown, the output of the first detector 12 will be zero because in the small section of the infrared spectrum that the first detector "sees," the opaque sections of the chopper blade and the background are both gray radiators. However, in the presence of the unknown agent the infrared radiation that impinges upon the first detector cell will undergo a change due to absorption of the unknown in that particular portion of the infrared spectrum to which the first detector cell is sensitive. The result will be a deflection of the meter 38 and of the recorder trace on recorder 39 that is a function of the presence of the agent or unknown in the optical path defined by the lens 29 and the entry opening of the detector.

It should be clear to those skilled in the art, that many variations may be made in the apparatus without departing from the spirit of the invention, which is defined in the following claims.

What is claimed is:

1. An infrared analyzer for use in detecting the presence of a substance in an open path between said analyzer and an uncontrolled radiating background comprising:

first detector means responsive to a wavelength region at which said substance has an absorption characteristic and producing an output as a function of the incident radiation in said region;

second detector means responsive to another wavelength region at which said substance has no principal absorption band and producing an output as a function of the incident radiation in said other region, said first and second detector means disposed to receive radiant energy from said path;

chopping means for periodically interrupting radiation from said path impinging upon said first and second detector means;

temperature control means responsive to the output of said second detector means to maintain said chopping means at the same apparent temperature of said uncontrolled background whereby the output signal of said second detector is minimized; and means connected to said first detector means for indicating the output of said first detector means whereby the presence of said substance in said path is detected.

2. An optical analyzer for use in detecting the presence of a substance in an open path between said analyzer and an uncontrolled radiating background comprising:

first detector means responsive to a wavelength at which said substance has an absorption band and producing an output signal as a function of the incident radiation at said wavelength;

second detector means responsive to another wavelength at which said substance has no principal absorption band and producing an output signal as a function of the incident radiation at said other wavelength, each of said wavelengths being in the radiant energy emission spectrum of said background;

movable means for alternately and cyclically exposing said first and second detector means to radiation from said movable means and from said path;

heat exchange means in heat exchange relationship with said movable means;

control means connected to said second detector means and operable to control said heat exchange means to reduce the output signal of said second detector means to a minimum value; and means connected to said first detector means for indicating the magnitude of the output signal generated by said first detector means thereby to indicate the quantity of said unknown substance in said path.

3. An infrared analyzer for detection of a substance along an open optical path between said analyzer and an uncontrolled radiating background, said substance exhibiting an absorption characteristic at a first wavelength comprising
    a first detector for generating a signal in response to radiation of said first wavelength,
    a second detector for generating a signal in response to radiation of a second wavelength in part of the spectrum other than that at which said substance exhibits absorption characteristics,
    a source,
    means for alternately directing radiation emitted along said optical path and radiation emitted by said source to said first and second detectors, and
    temperature control means responsive to the alternating signal produced in said second detector and effective to control the temperature of said source so as to reduce the alternating signal produced in said second detector to a minimum, whereby the amplitude of the alternating signal produced in said first detector is a function of the presence of said substance along said optical path.

4. An instrument for analyzing a constituent of a fluid outside the instrument in the presence of an uncontrolled radiating background comprising
    a first detector having an enclosure filled with a mass of a gas having an absorption characterstics in a spectral area corresponding to an absorption peak of said constituent and relatively less absorbing in adjacent spectral regions;
    a second detector having an enclosue filled with a mass of gas having a characteristic so as to absorb more predominantly in spectral regions adjacent the absorption characteristic of said constituent, said second detector being disposed in optical series relationship with said first detector, each of said first and second detectors including impedance means for varying an electrical characteristic in response to radiation passing through said detectors;
    first and second output means connected respectively to the impedance means of each of said first and second detectors for producing an output signal;
    means for defining an optical path that passes through the fluid in which said constituent is to be analyzed and said first and second detectors;
    means including a source of reference radiation for alternately exposing said first and second detectors to said optical path and said source of reference radiation; and
    means connected with said second output means for regulating the apparent intensity of said source of reference radiation so as to reduce the output signal of said second detector to zero whereby said first output means produces a signal that is indicative of the quantity of said constituent to be analyzed in said fluid.

5. An instrument for analyzing a constituent of a fluid in the presence of an uncontrolled radiating background comprising
    a first detector having an enclosure filled with a mass of fluid having an absorption characteristic in a spectral area corresponding to an absorption peak of said constituent and relatively less absorbing in adjacent spectral regions;
    a second detector having an enclosure filled with a mass of fluid having a characteristic so as to absorb more predominantly in spectral regions adjacent the absorption characteristic of said constituent, said second detector being disposed in optical series relationship with said first detector, said first and second detectors including impedance means that vary in response to radiation passing through said detectors;
    means for defining an optical sample path in which radiation emitted by said background passes through the fluid in which said constituent to be analyzed exists and subsequently through said first and second detectors;
    a source of reference radiation disposed so as to pass radiation through said first and second detectors;
    means for alternately impinging radiation from said optical path and radiation from said reference source upon said first and second detectors;
    means coupled to said second detector for controlling the temperature of said source of reference radiation so as to reduce the impedance variations of the impedance means of said second detector to zero and thereby to match the temperature of said background; and
    output means connected at least to the impedance means of said first detector for indication of the quantity of said constituent.

6. The instrument defined in claim 5 wherein said source of reference radiation is a rotating mask having infrared opaque and transparent sectors that upon rotation pass through said optical path.

7. The analyzer defined in claim 5 in which the means for defining an optical path include a lens of a material that is transparent to infrared radiation.

8. An infrared analyzer for detecting the presence of an unknown agent along an open path outside the analyzer in the presence of a radiating background comprising
    a first absorption detector that produces an output signal responsive to radiation variations characteristic of said unknown agent,
    a second absorption detector that produces an output signal responsive to a relatively wide band of infrared radiation,
    a temperature controlled object,
    means for defining an optical path in which the presence of said unknown agent is to be detected,
    beam switching means for alternately directing radiation from said temperature controlled object and from said optical path through said first and second detectors,
    control means connected to said second detector for controlling the temperature of said object, said control means receiving a signal from said second detector and operative to match the color temperature of said object to that of the radiation impinging upon said second detector from said optical path, and
    readout means connected to said first detector for producing a signal that is indicative of the presence of said unknown agent along said optical path.

9. The infrared analyzer according to claim 8 wherein the control means connected to said second detector for controlling the temperature of said object includes a plurality of thermoelements, said thermoelements being selectively cooled or heated depending on the polarity of a current passed therethrough.

10. An infrared analyzer for detecting an unknown agent in an open path outside the analyzer in the presence of an uncontrolled radiating background comprising
    first and second detectors arranged in optical series relationship, said first detector being responsive primarily to variations in infrared radiation in the absorption band of said unknown agent and producing an output that is a function thereof, said second detector being responsive to variations in infrared radiation in a wider spectrum and producing an output that is a function thereof,
    means for defining an optical path extending through a zone of space in which said unknown agent is to be detected and through said first and second detectors,
    a temperature controlled object disposed so as to allow radiation emitted therefrom to pass through said first and second detectors,
    means for alternately admitting, at a switching frequency, radiation from said optical path and from said temperature controlled object to both of said first and second detectors, control means for said temperature controlled object having an output signal of said second detector as an input, said control means acting to reduce the output of said second detector that varies with the switching frequency to zero, and thereby match the color temperature of said object to that of the radiation from said optical path, and means for measuring the output of said first detector as a function of the presence of said unknown agent in said optical path.

References Cited by the Examiner

UNITED STATES PATENTS

| | | | |
|---|---|---|---|
| 2,924,713 | 2/1960 | Liston | 250—83.3 |
| 2,933,600 | 4/1960 | Spracklen et al. | 250—43.5 |
| 3,032,655 | 5/1962 | Romans | 250—43.5 |
| 3,082,325 | 3/1963 | Speyer | 250—83.3 |
| 3,091,690 | 5/1963 | McHenry | 250—43.5 |

RALPH G. NILSON, *Primary Examiner.*